United States Patent
Wang

(10) Patent No.: US 7,886,925 B2
(45) Date of Patent: Feb. 15, 2011

(54) MODULARIZED BAMBOO FRAME MEMBER SET

(76) Inventor: Wen-Tsan Wang, 6F., No. 300, Jui Kuang Rd., Taipei City (TW)

( * ) Notice: Subject to any disclaimer, the term of this patent is extended or adjusted under 35 U.S.C. 154(b) by 809 days.

(21) Appl. No.: 11/863,299

(22) Filed: Sep. 28, 2007

(65) Prior Publication Data

US 2009/0084797 A1 Apr. 2, 2009

(51) Int. Cl.
*B65D 39/00* (2006.01)
*B65D 6/00* (2006.01)
*B65D 8/04* (2006.01)

(52) U.S. Cl. .................. 217/122; 220/669; 220/682

(58) Field of Classification Search ............... 220/669, 220/682, 684, 685, 694, 4.11, 4.26, 4.28; 217/122, 56
See application file for complete search history.

(56) References Cited

U.S. PATENT DOCUMENTS

| | | | | |
|---|---|---|---|---|
| 2,861,277 A * | 11/1958 | Hermann | .................... | 220/642 |
| 2,890,744 A * | 6/1959 | Ng | ..................... | 297/440.22 |
| 3,433,382 A * | 3/1969 | Boggio | ..................... | 220/592 |
| 3,951,294 A * | 4/1976 | Wilson | ..................... | 220/4.31 |
| 5,118,201 A * | 6/1992 | Cook | ..................... | 383/12 |
| D410,146 S * | 5/1999 | Longaberger et al. | ..................... | D3/306 |
| 6,085,933 A * | 7/2000 | Brunazzo | ..................... | 220/760 |
| D434,902 S * | 12/2000 | Longaberger et al. | ..................... | D3/306 |
| D438,704 S * | 3/2001 | Longaberger et al. | ..................... | D3/306 |
| 6,230,914 B1 * | 5/2001 | Wang | ..................... | 217/56 |
| 6,419,103 B1 * | 7/2002 | Wang | ..................... | 220/4.33 |
| 6,505,751 B1 * | 1/2003 | Haas | ..................... | 220/4.11 |
| D472,050 S * | 3/2003 | Lacy et al. | ..................... | D3/306 |
| 7,318,953 B2 * | 1/2008 | Wang | ..................... | 428/54 |
| 7,555,819 B2 * | 7/2009 | Wensley | ..................... | 27/3 |
| 7,753,219 B2 * | 7/2010 | Wang | ..................... | 211/182 |
| 7,823,738 B2 * | 11/2010 | Wang | ..................... | 220/4.28 |
| 2003/0200710 A1 * | 10/2003 | Gil | ..................... | 52/233 |
| 2004/0108303 A1 * | 6/2004 | Wang | ..................... | 217/122 |
| 2007/0007224 A1 * | 1/2007 | Wang | ..................... | 211/198 |
| 2007/0166502 A1 * | 7/2007 | Wang | ..................... | 428/55 |
| 2008/0041849 A1 * | 2/2008 | Wang | ..................... | 220/4.28 |
| 2008/0115702 A1 * | 5/2008 | Wang | ..................... | 108/161 |
| 2008/0168931 A1 * | 7/2008 | Wang | ..................... | 108/157.1 |
| 2008/0290098 A1 * | 11/2008 | Wang | ..................... | 220/660 |
| 2009/0065461 A1 * | 3/2009 | Wang | ..................... | 211/182 |
| 2009/0084797 A1 * | 4/2009 | Wang | ..................... | 220/660 |
| 2009/0217619 A1 * | 9/2009 | Wang | ..................... | 52/848 |
| 2009/0232593 A1 * | 9/2009 | Wang | ..................... | 403/341 |
| 2009/0250141 A1 * | 10/2009 | Wang | ..................... | 144/333 |
| 2010/0006528 A1 * | 1/2010 | Wang | ..................... | 211/182 |
| 2010/0078430 A1 * | 4/2010 | Wang | ..................... | 220/4.28 |
| 2010/0089852 A1 * | 4/2010 | Wang | ..................... | 211/153 |

FOREIGN PATENT DOCUMENTS

EP 1442988 A1 * 8/2004

* cited by examiner

*Primary Examiner*—Anthony Stashick
*Assistant Examiner*—Shawn M Braden
(74) *Attorney, Agent, or Firm*—Leong C. Lei

(57) ABSTRACT

A modularized bamboo frame member set is disclosed in which bamboo poles are cut into straight bamboo strip elements and then the bamboo strip elements are processed into ⊓-shaped, L-shaped and arched bamboo rod members through a compression molding press so that the ⊓-shaped, L-shaped and arched bamboo rod members are selectively used and connected end-to-end to construct rectangular, circular and oval bamboo frame members for making bamboo baskets.

3 Claims, 11 Drawing Sheets

MODULARIZED BAMBOO FRAME MEMBER SET

BACKGROUND OF THE INVENTION (a) Technical Field of the Invention

The present invention relates to bamboo baskets and more particularly, to the fabrication of modularized bamboo frame member set for bamboo baskets.

(b) Description of the Prior Art

Various materials including ceramics, glass, wood, plastics, stainless steel, and etc. may be used for making tables, chairs, cabinets, storage containers, and many other furniture. To show an antique sense of beauty, wood and bamboo are intensively used to make furniture and storage containers.

A conventional bamboo furniture is known comprising a frame structure and a plurality of wall panels formed of bamboo strips by weaving. These bamboo panels have open spaces, and are fastened to the frame structure by an adhesive or by means of binding wires. There is known another structure of bamboo furniture in which the bamboo panels are formed of transverse bamboo slats and longitudinal bamboo slats, and the transverse and longitudinal bamboo slats are fastened together by rattan cords. The fabrication of this structure of bamboo furniture requires much time and labor, and therefore the cost of this structure of bamboo furniture is high.

There is also another design of bamboo storage container invented by the present inventor, which comprises a top frame, a bottom frame, and a plurality of bamboo slats connected between the top frame and the bottom frame. The bamboo slats have the respectively top and bottom ends respectively fastened to respective bottom mounting holes on the top frame and respective top mounting holes on the bottom frame. Because the bamboo slats are springy, it requires much time and labor to fasten the bamboo slats to the top frame and the bottom frame. Further, the top frame and the bottom frame are each formed of four bamboo slats, and the four bamboo slats are connected to one another end to end to form a rectangular open frame. The fabrication of this design of bamboo storage container also requires much time and labor. Therefore, this design of bamboo storage container is not suitable for mass production. Further, the top frame and the bottom frame have sharp angles, having less sense of beauty.

SUMMARY OF THE INVENTION

The primary purpose of the present invention is to provide a bamboo frame member fabrication method, which is practical for mass production of bamboo frame members for making bamboo baskets that cause an unique sense of beauty.

According to one aspect of the present invention, bamboo poles are cut into straight bamboo strip elements and then the bamboo strip elements are processed into curved bamboo rod members through a compression molding press so that the curved bamboo rod members are selectively used and connected end-to-end to construct rectangular, circular and oval bamboo frame members for making bamboo baskets.

According to another aspect of the present invention, the curved bamboo rod members can be selectively connected together end-to-end to construct rectangular, circular and oval bamboo frame members by means of an adhesive, plug joint, or fastener means.

According to still another aspect of the present invention, the bamboo rod members include ⊓-shaped and L-shaped bamboo rod members. Four L-shaped bamboo rod members, two ⊓-shaped bamboo rod members, or one ⊓-shaped bamboo rod members with two L-shaped bamboo rod members can be connected together end-to-end to construct a rectangular bamboo frame member.

According to still another aspect of the present invention, the bamboo rod members include arched bamboo rod members. Four 45° arched bamboo rod members, or two 90° arched bamboo rod members, or one 90° arched bamboo rod members with two 45° arched bamboo rod members can be connected together end-to-end to construct a circular bamboo frame member.

According to still another aspect of the present invention, the bamboo rod members include arched bamboo rod members. 2, 3, or 4 arched bamboo rod members can be connected together end-to-end to construct an oval bamboo frame member.

According to still another aspect of the present invention, the number of bamboo rod members that construct one bamboo frame member can be 2, 3, 4, or more without limitation.

According to still another aspect of the present invention, the rectangular, circular and/or oval bamboo frame members can be used and connected with slats and/or blocks to construct bamboo baskets.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
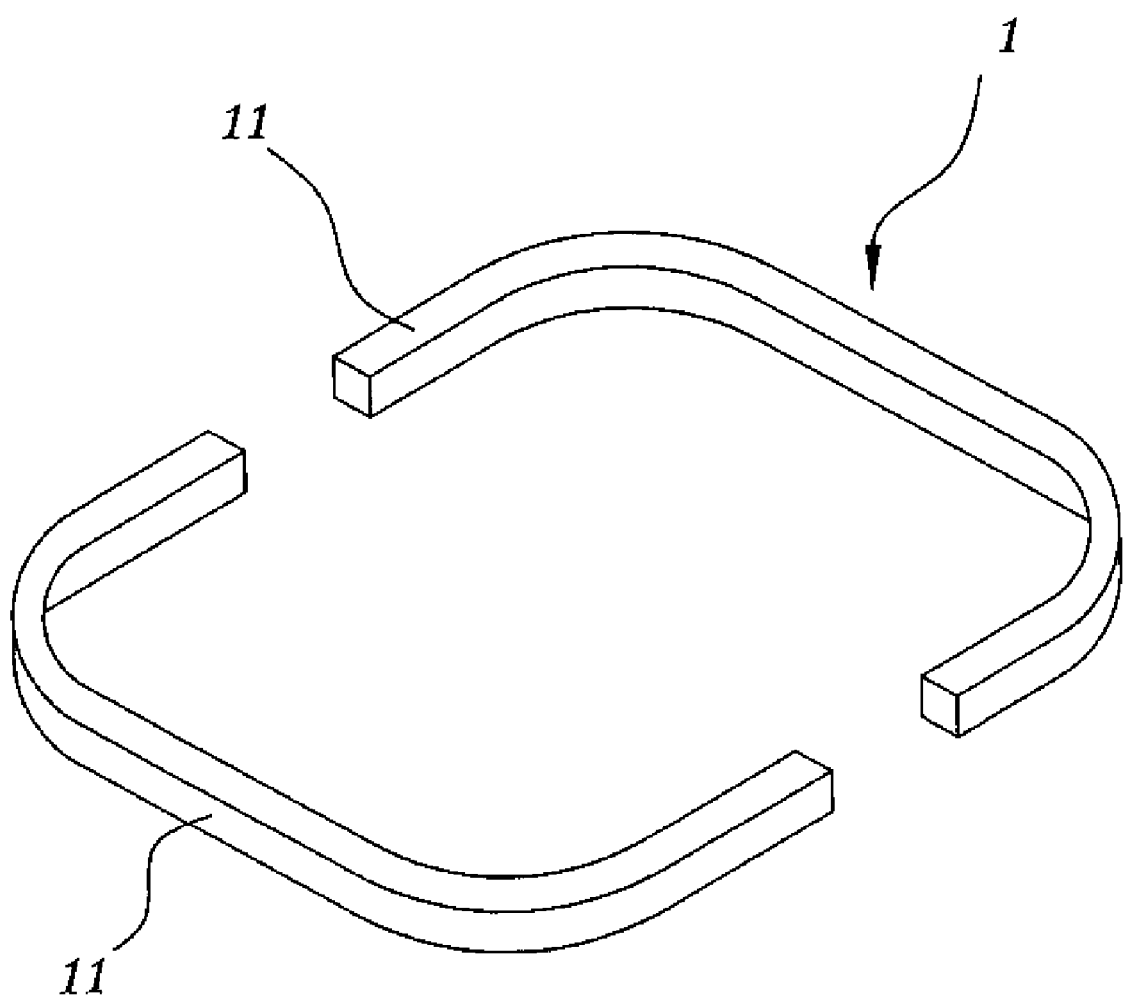
FIG. 1 is an exploded view of two ⊓-shaped bamboo rod members for a rectangular bamboo flame member according to the present invention.

Referring to FIG. 1, bamboo poles are cut into straight bamboo strip elements subject to a predetermined size, and then the bamboo strip elements are processed into ⊓-shaped bamboo rod members 11 through a compression molding press, and each two ⊓-shaped bamboo rod members 11 are fixedly connected together end-to-end to form a respective a bamboo frame member 1 having the shape of a rectangular open frame. The ends of each two ⊓-shaped bamboo rod members 11 may be fixedly connected together by means of an adhesive, plug joint, or a fastener.

Figure 2:
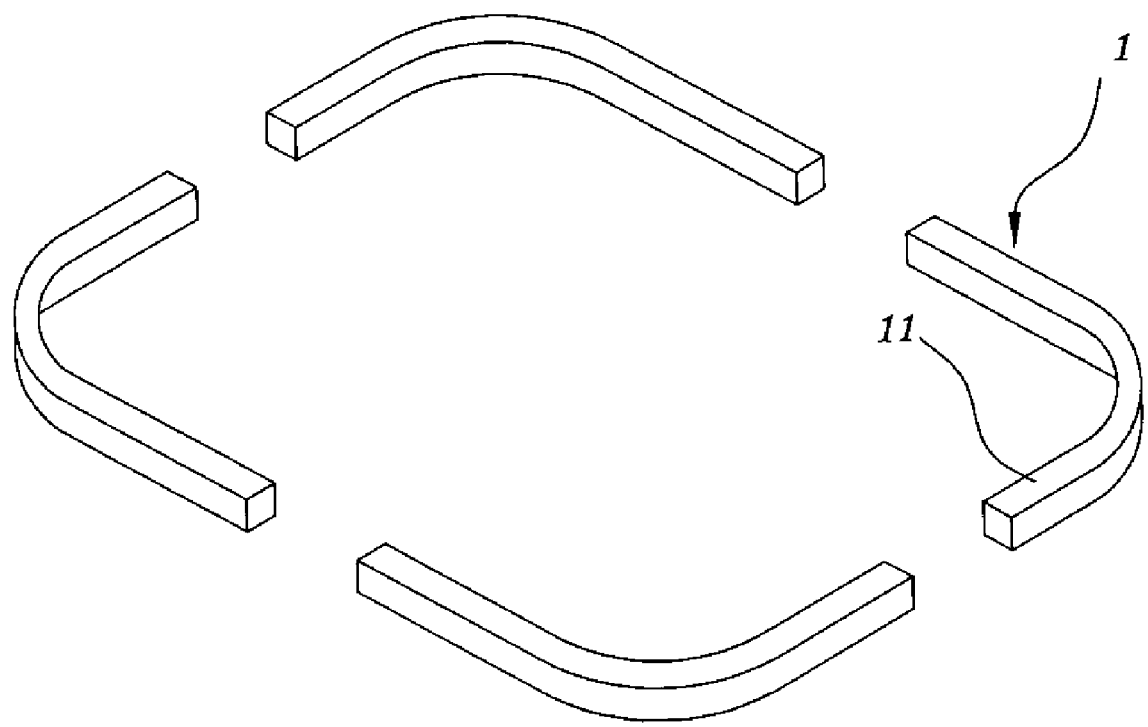
FIG. 2 is an exploded view of four L-shaped bamboo rod members for a rectangular bamboo frame member according to the present invention.

Referring to FIG. 2, bamboo poles are cut into straight bamboo strip elements subject to a predetermined size, and then the bamboo strip elements are processed into L-shaped bamboo rod members 11 through a compression molding press, and each 4 L-shaped bamboo rod members 11 are fixedly connected together end-to-end to form a respective a bamboo frame member 1 having the shape of a rectangular open frame.

Figure 3:
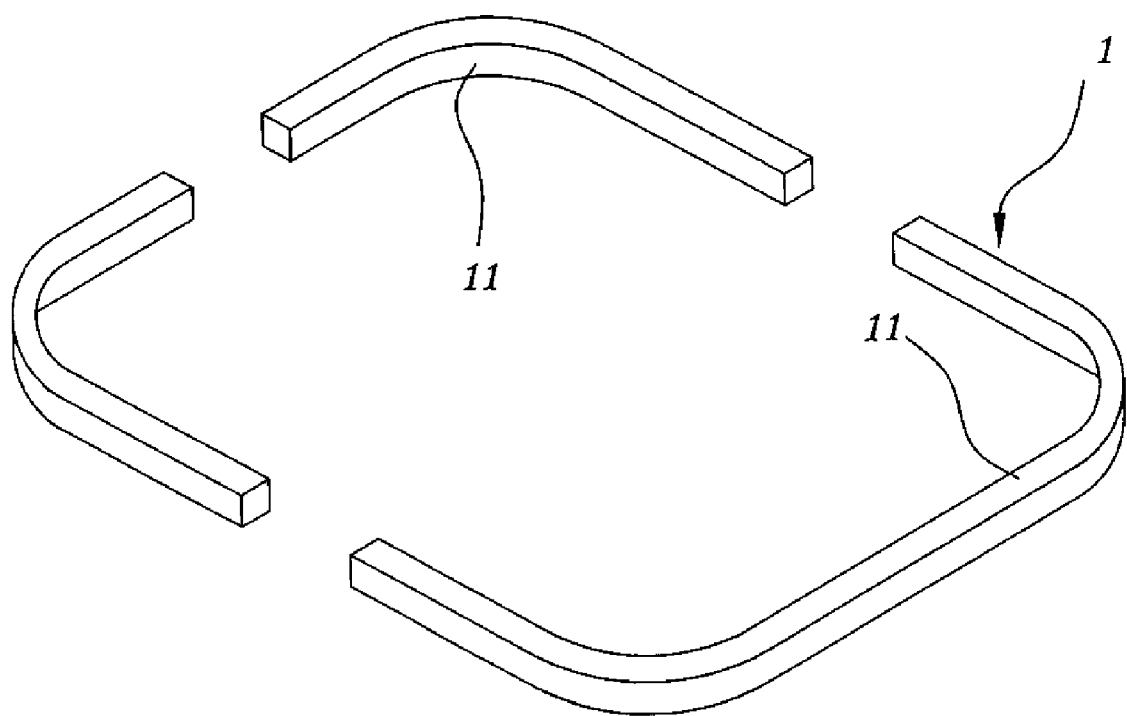
FIG. 3 is an exploded view of a ⊓-shaped bamboo rod member and two L-shaped bamboo rod members for a rectangular bamboo frame member according to the present invention.

Referring to FIG. 3, bamboo poles are cut into straight bamboo strip elements subject to a predetermined size, and then the bamboo strip elements are processed into ⊓-shaped and L-shaped bamboo rod members 11 through a compression molding press, and each ⊓-shaped bamboo rod members 11 is fixedly connected with two L-shaped bamboo rod members 11 end-to-end to form a respective bamboo frame member 1 having the shape of a rectangular open frame.

Figure 4A:
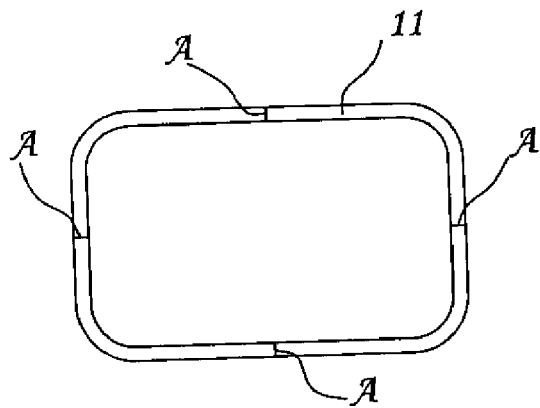
FIG. 4A is a top plain view of a rectangular bamboo frame member formed of one ⊓-shaped bamboo rod member and two L-shaped bamboo rod members according to the present invention.

Referring to FIG. 4A, 4 L-shaped bamboo rod members 11 are fixedly connected together end-to-end to form a bamboo frame member 1 having the shape of a rectangular open frame, and a joint face A is disposed between each two adjacent L-shaped bamboo rod members 11. Therefore, the bamboo frame member 1 has 4 joint faces A.

Figure 4B:
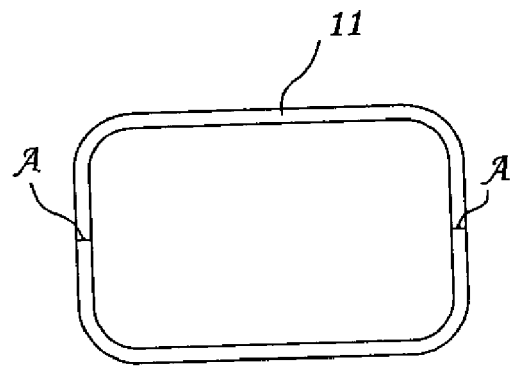
FIG. 4B is a top plain view of a rectangular bamboo frame member formed of two ⊓-shaped bamboo rod members according to the present invention.

Referring to FIG. 4B, 2 ⊓-shaped bamboo rod members 11 are fixedly connected together end-to-end to form a bamboo frame member 1 having the shape of a rectangular open frame, and two joint faces A are respectively disposed between the ends of the two ⊓-shaped bamboo rod members 11.

Figure 4C:
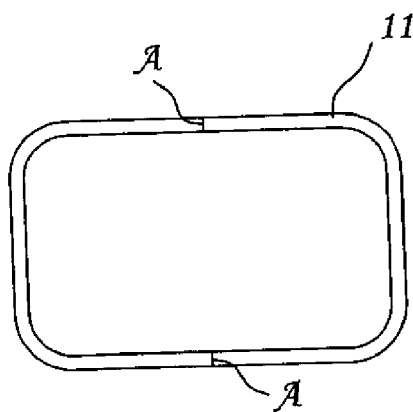
FIG. 4C is a top plain view of a rectangular bamboo frame member formed of two ⊓-shaped bamboo rod members according to the present invention.

Referring to FIG. 4C, 2 ⊓-shaped bamboo rod members 11 are fixedly connected together end-to-end to form a bamboo frame member 1 having the shape of a rectangular open frame, and two joint faces A are respectively disposed between the ends of the two ⊓-shaped bamboo rod members 11. This embodiment is substantially similar to the embodiment shown in FIG. 4B with the exception of the size of the ⊓-shaped bamboo rod members 11.

Figure 4D:
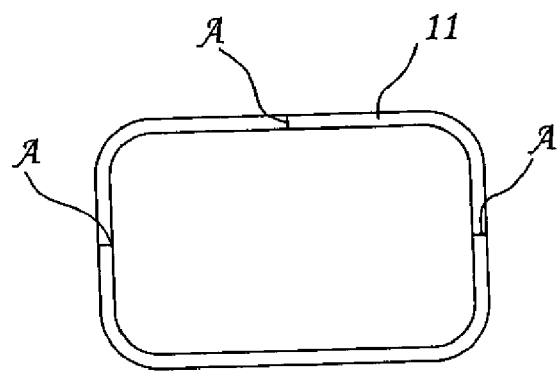
FIG. 4D is a top plain view of a rectangular bamboo frame member formed of one ⊓-shaped bamboo rod member and two L-shaped bamboo rod members according to the present invention.

Referring to FIG. 4D, one ⊓-shaped bamboo rod member 11 and two L-shaped bamboo rod members 11 are fixedly connected together end-to-end to form a bamboo flame member 1 having the shape of a rectangular open frame, and tree joint faces A are respectively disposed between the ends of the two ⊓-shaped bamboo rod member 11 and one end of each of the L-shaped bamboo rod members 11 and between the other end of each of the two L-shaped bamboo rod members 11. Therefore, the bamboo flame member 1 of this embodiment has total tree joint faces A.

Figure 5A:
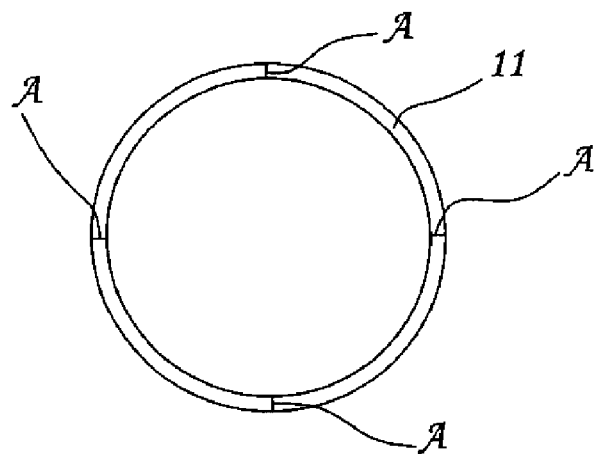
FIG. 5A is a top plain view of a circular bamboo frame member formed of four arched bamboo rod members according to the present invention.

Referring to FIG. 5A, 4 arched bamboo rod members 11 are fixedly connected together end-to-end to form a bamboo frame member 1 having the shape of a circular open frame, and a joint face A is respectively disposed between each two adjacent arched bamboo rod members 11. Therefore, the bamboo frame member 1 of this embodiment has total 4 joint faces A.

Figure 5B:
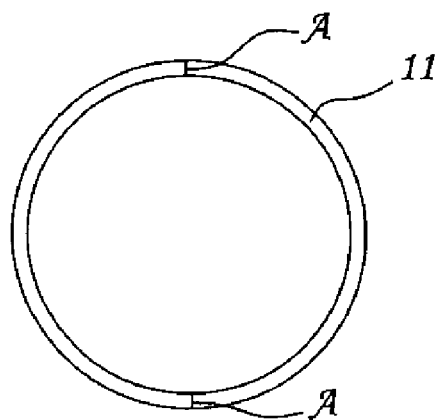
FIG. 5B is a top plain view of a circular bamboo frame member formed of two arched bamboo rod members according to the present invention.

Referring to FIG. 5B, 2 arched bamboo rod members 11 are fixedly connected together end-to-end to form a bamboo frame member 1 having the shape of a circular open frame, and two joint faces A are respectively disposed between the ends of the two arched bamboo rod members 11. Therefore, the bamboo frame member 1 of his embodiment has total 2 joint faces A.

Figure 5C:
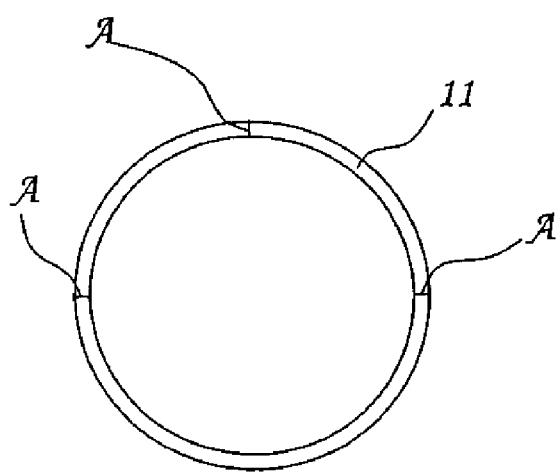
FIG. 5C is a top plain view of a circular bamboo frame member formed of tree arched bamboo rod members according to the present invention.

Referring to FIG. 5C, 3 arched bamboo rod members 11 are fixedly connected together end-to-end to form a bamboo frame member 1 having the shape of a circular open frame, and two joint face A is respectively disposed between each two adjacent arched bamboo rod members 11. Therefore, the bamboo frame member 1 of this embodiment has total 3 joint faces A. According to this embodiment, the three arched bamboo rod members 11 include one 90° arched bamboo rod member and two 45° arched bamboo rod members.

Figure 6A:
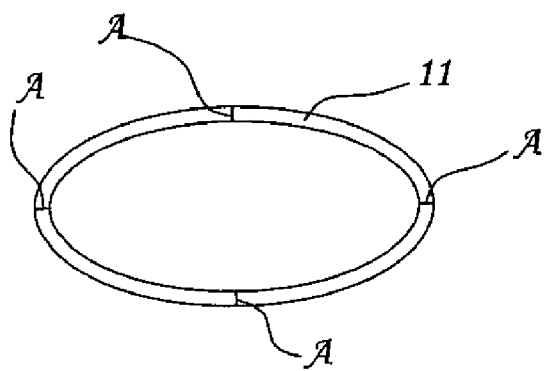
FIG. 6A is a top plain view of an oval bamboo frame member formed of four arched bamboo rod members according to the present invention.

Referring to FIG. 6A, 4 arched bamboo rod members 11 are fixedly connected together end-to-end to form a bamboo frame member 1 having the shape of an oval open fame, and a joint face A is respectively disposed between each two adjacent arched bamboo rod members 11. Therefore, the bamboo frame member 1 of this embodiment has total 4 joint faces A.

Figure 6B:
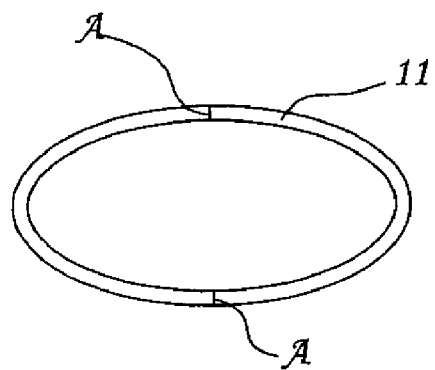
FIG. 6B is a top plain view of an oval bamboo frame member formed of two arched bamboo rod members according to the present invention.

Referring to FIG. 6B, 2 arched bamboo rod members 11 are fixedly connected together end-to-end to form a bamboo frame member 1 having the shape of an oval open frame, and two joint faces A are respectively disposed between the ends of the two arched bamboo rod members 11. Therefore, the bamboo fame member 1 of this embodiment has total 2 joint faces A.

Figure 6C:
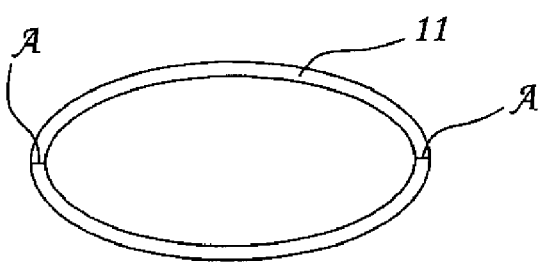
FIG. 6C is a top plain view of an oval bamboo frame member formed of two arched bamboo rod members according to the present invention.

Referring to FIG. 6C, 2 arched bamboo rod members 11 are fixedly connected together end-to-end to form a bamboo frame member 1 having the shape of an oval open frame, and two joint faces A are respectively disposed between the ends of the two arched bamboo rod members 11. Therefore, the bamboo frame member 1 of this embodiment has total 2 joint faces A. This embodiment is substantially similar to the embodiment shown in FIG. 6B with the exception of the size of the arched bamboo rod members 11.

Figure 6D:
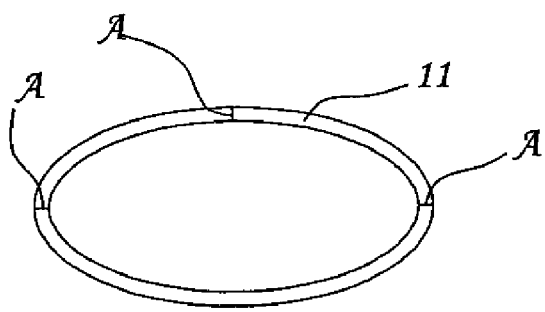
FIG. 6D is a top plain view of an oval bamboo frame member formed of tree arched bamboo rod members according to the present invention.

Referring to FIG. 6D, 3 arched bamboo rod members 11 are fixedly connected together end-to-end to form a bamboo frame member 1 having the shape of an oval open frame, and two joint face A is respectively disposed between each two adjacent arched bamboo rod members 11. Therefore, the bamboo frame member 1 of this embodiment has total 3 joint faces A. According to this embodiment, the three arched bamboo rod members 11 include one 90° arched bamboo rod member and two 45° arched bamboo rod members.

Figure 7:
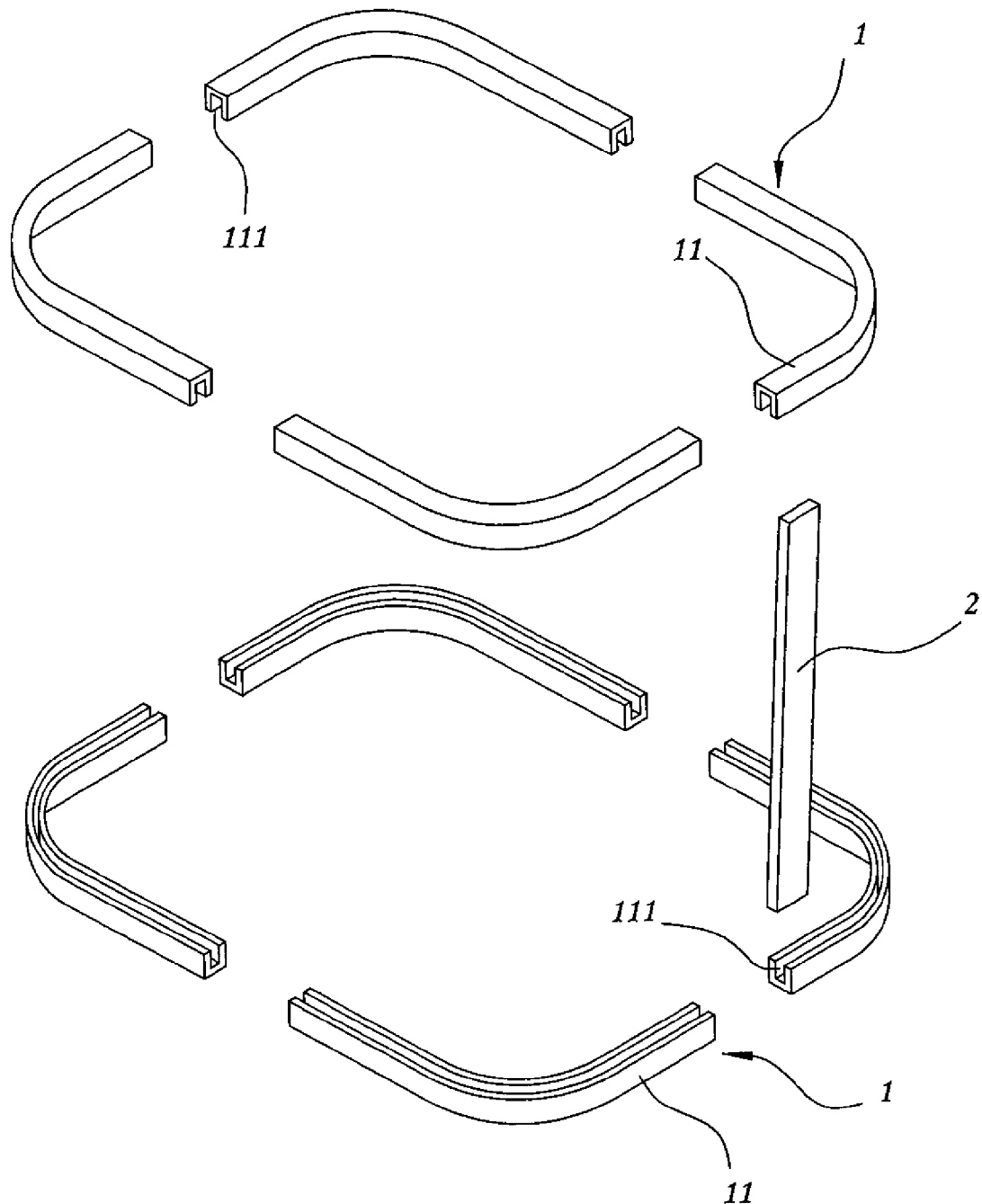
FIG. 7 is an exploded view of a part of a rectangular bamboo basket based on longitudinally grooved L-shaped bamboo rod members.

Referring to FIG. 7, the L-shaped bamboo rod members 11 each have a mounting groove 111 extending on one side along the length. When the L-shaped bamboo rod members 11 are fixedly connected together end-to-end to form a bamboo frame member 1 having the shape of an oval open frame, the mounting grooves 111 of the L-shaped bamboo rod members 11 constitute an endless mounting groove. Two bamboo flame members 1 of this design can be mounted with a number of slats 2 to construct a rectangular bamboo basket by reversely arranging the two bamboo frame members 1 at the top and bottom sides and then vertically inserting the two ends of each slat 2 into the endless mounting grooves of the two bamboo fame members 1.

Figure 8:
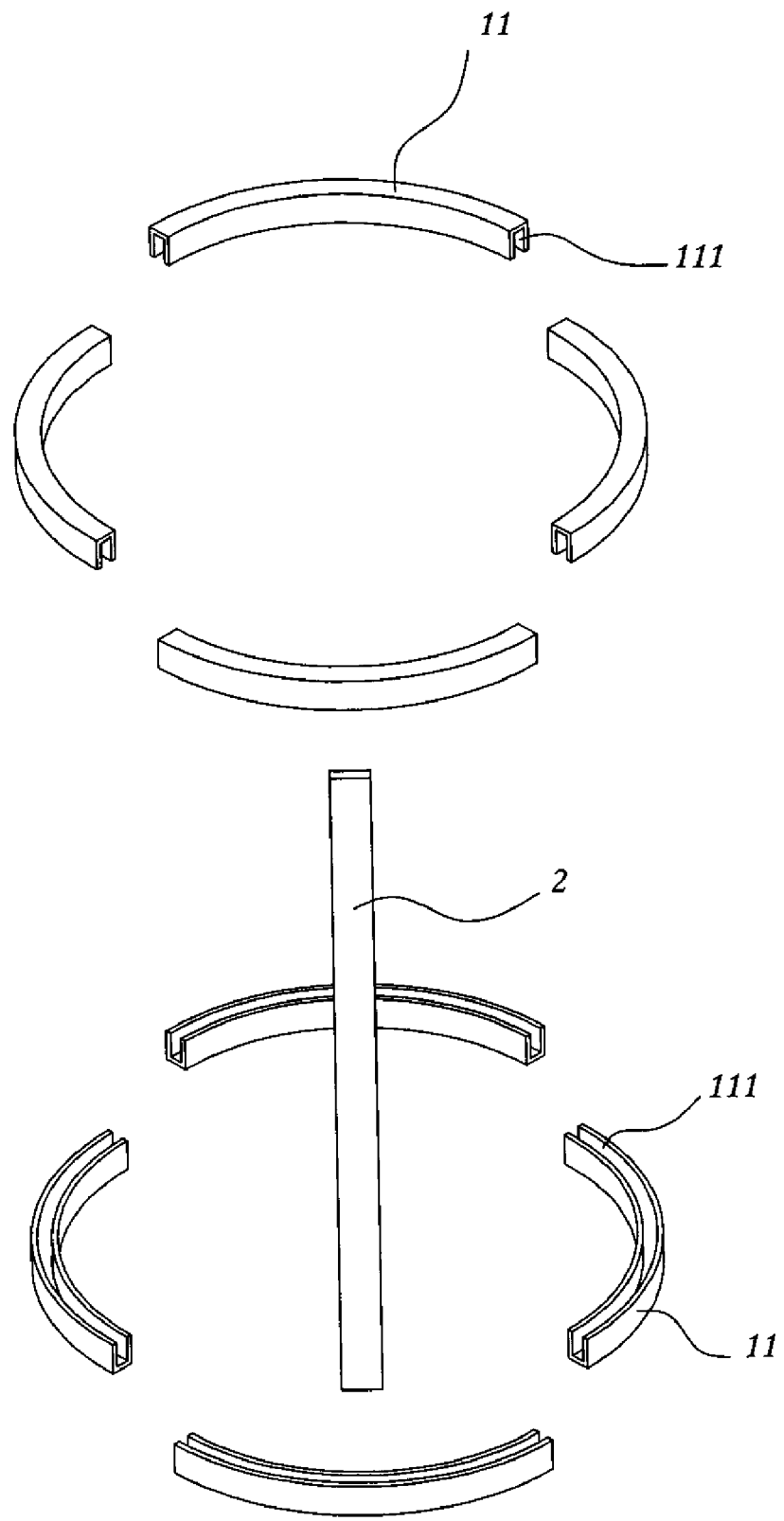
FIG. 8 is an exploded view of a part of a circular bamboo basket based on longitudinally grooved arched bamboo rod members.

Referring to FIG. 8, the arched bamboo rod members 11 each have a mounting groove 111 extending on one side along the length. When the arched bamboo rod members 11 are fixedly connected together end-to-end to form a bamboo frame member 1 having the shape of a circular open fame, the mounting grooves 111 of the L-shaped bamboo rod members 11 constitute an endless mounting groove. Two bamboo frame members 1 of this design can be mounted with a number of slats 2 to construct a circular bamboo basket by reversely arranging the two bamboo flame members 1 at the top and bottom sides and then vertically inserting the two ends of each slat 2 into the endless mounting grooves of the two bamboo frame members 1.

Figure 9:
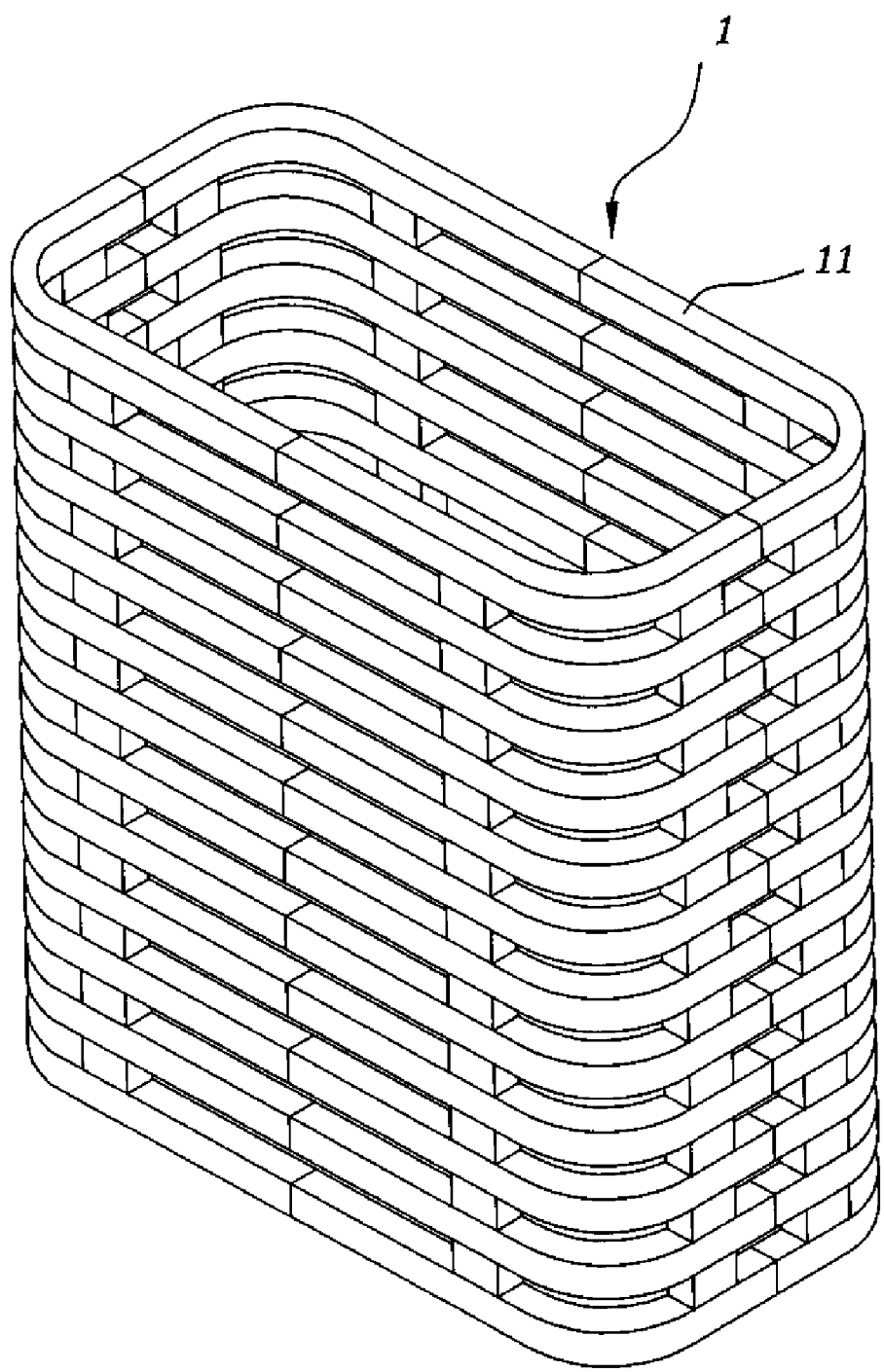
FIG. 9 illustrates a rectangular bamboo basket made of rectangular bamboo frame members according to the present invention.

FIG. 9 illustrates a rectangular bamboo basket constructed according to the present invention. According to this embodiment, ⊓-shaped and L-shaped bamboo rod members 11 are used to construct bamboo frame members 1 having the shape of a rectangular open frame, and the bamboo frame members 1 thus obtained are mounted with slats and block members to form a rectangular bamboo basket.

Figure 10:
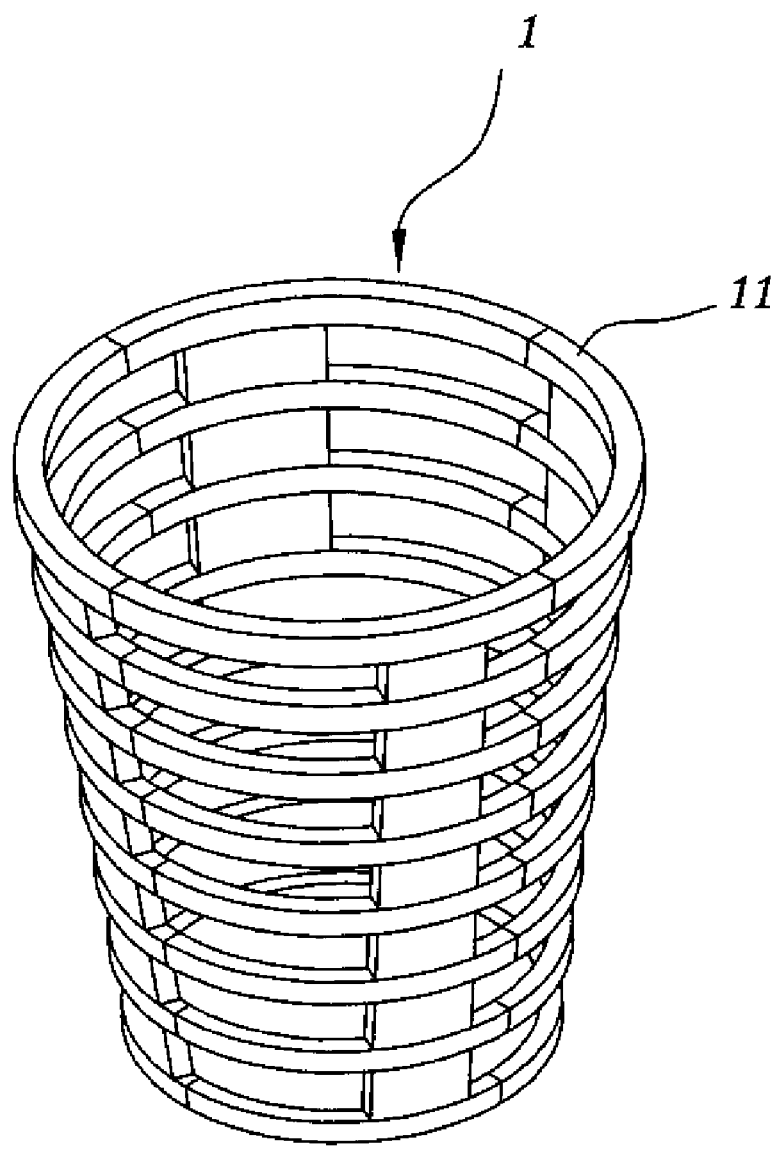
FIG. 10 illustrates a circular bamboo basket made of circular bamboo frame members according to the present invention.

FIG. 10 illustrates different sizes of bamboo frame members 1 having the shape of a rectangular open frame are mounted with slats and block members to form a circular bamboo basket that has a diameter gradually increasing from the bottom side toward the top side.

Figure 11:
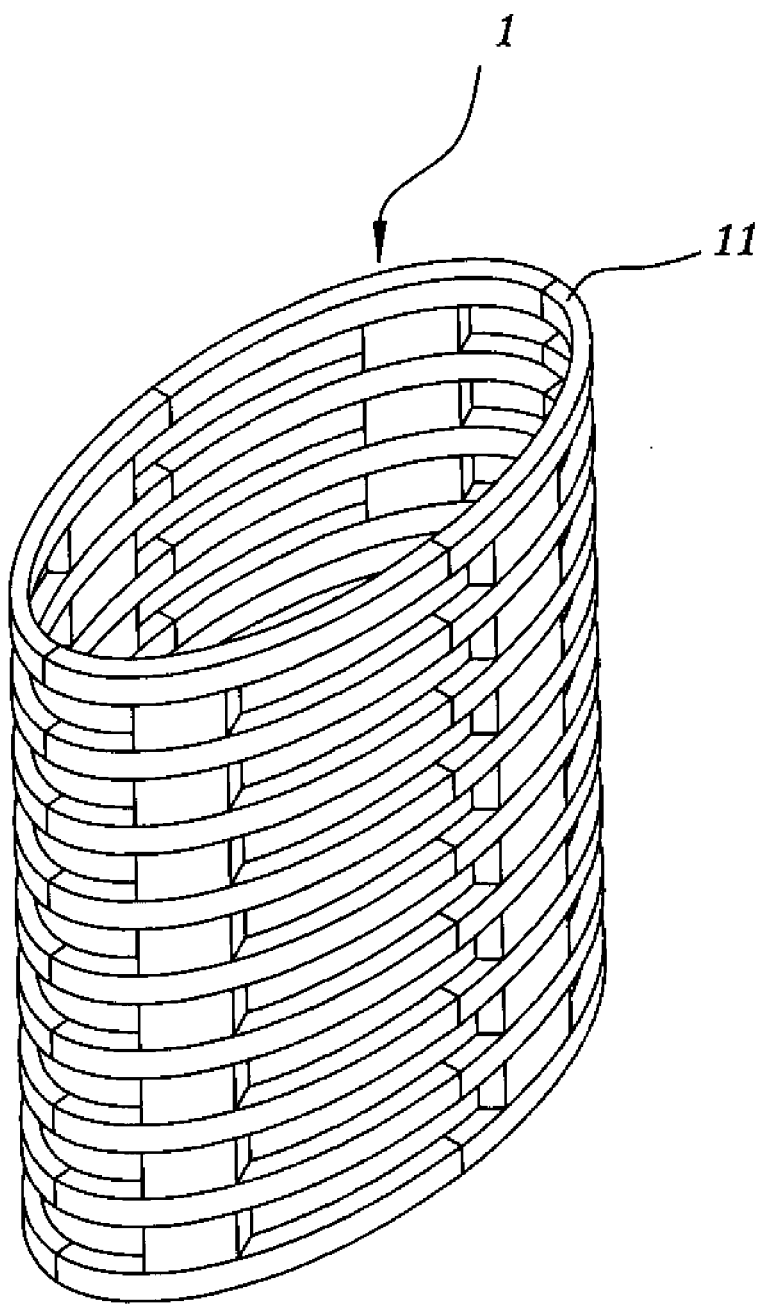
FIG. 11 illustrates an oval bamboo basket made of oval bamboo frame members according to the present invention.

FIG. 11 illustrates a plurality of bamboo flame members 1 having the shape of an oval open frame are mounted with slats and block members to form an oval bamboo basket.

Although particular embodiments of the inventions have been described in detail for purposes of illustration, various modifications and enhancements may be made without departing from the spirit and scope of the invention. Accordingly, the invention is not to be limited except as by the appended claims.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A modularized bamboo frame member set comprising a plurality of rectangular bamboo frame members, a plurality of circular bamboo fame members, and a plurality of oval bamboo frame members respectively formed of a plurality of bamboo rod members, said bamboo rod members including ⊓-shaped bamboo rod members and L-shaped bamboo rod members and arched bamboo rod members respectively prepared straight bamboo strip elements through a compression molding press, said rectangular bamboo frame members including one formed of four said L-shaped bamboo rod members that are connected together end-to-end and one formed of two said ⊓-shaped bamboo rod members that are fixedly connected together end-to-end and one formed of one said ⊓-shaped bamboo rod members and two said L-shaped bamboo rod members that are fixedly connected together end-to-end, said circular bamboo frame members including one formed of four said arched bamboo rod members that are fixedly connected together end-to-end and one formed of three said arched bamboo rod members that are fixedly connected together end-to-end and one formed of two said arched bamboo rod members that are fixedly connected together end-to-end, said oval bamboo frame members including one formed of four said arched bamboo rod members that are fixedly connected together end-to-end and one formed of three said arched bamboo rod members that are fixedly connected together end-to-end and one formed of two said arched bamboo rod members that are fixedly connected together end-to-end.

2. The modularized bamboo frame member set as claimed in claim 1, wherein said bamboo rod members are solid members.

3. The modularized bamboo frame member set as claimed in claim 1, wherein said bamboo rod members each have a mounting groove longitudinally extending to along the length thereof, and the mounting grooves of the bamboo rod members of each of said rectangular bamboo frame members and said circular bamboo frame members and said oval bamboo frame members are connected to one another to form an endless mounting groove.

* * * * *